Feb. 26, 1935.  O. C. SCHMIDT  1,992,891
LIQUID CIRCULATING MEANS
Filed July 29, 1933  3 Sheets-Sheet 1
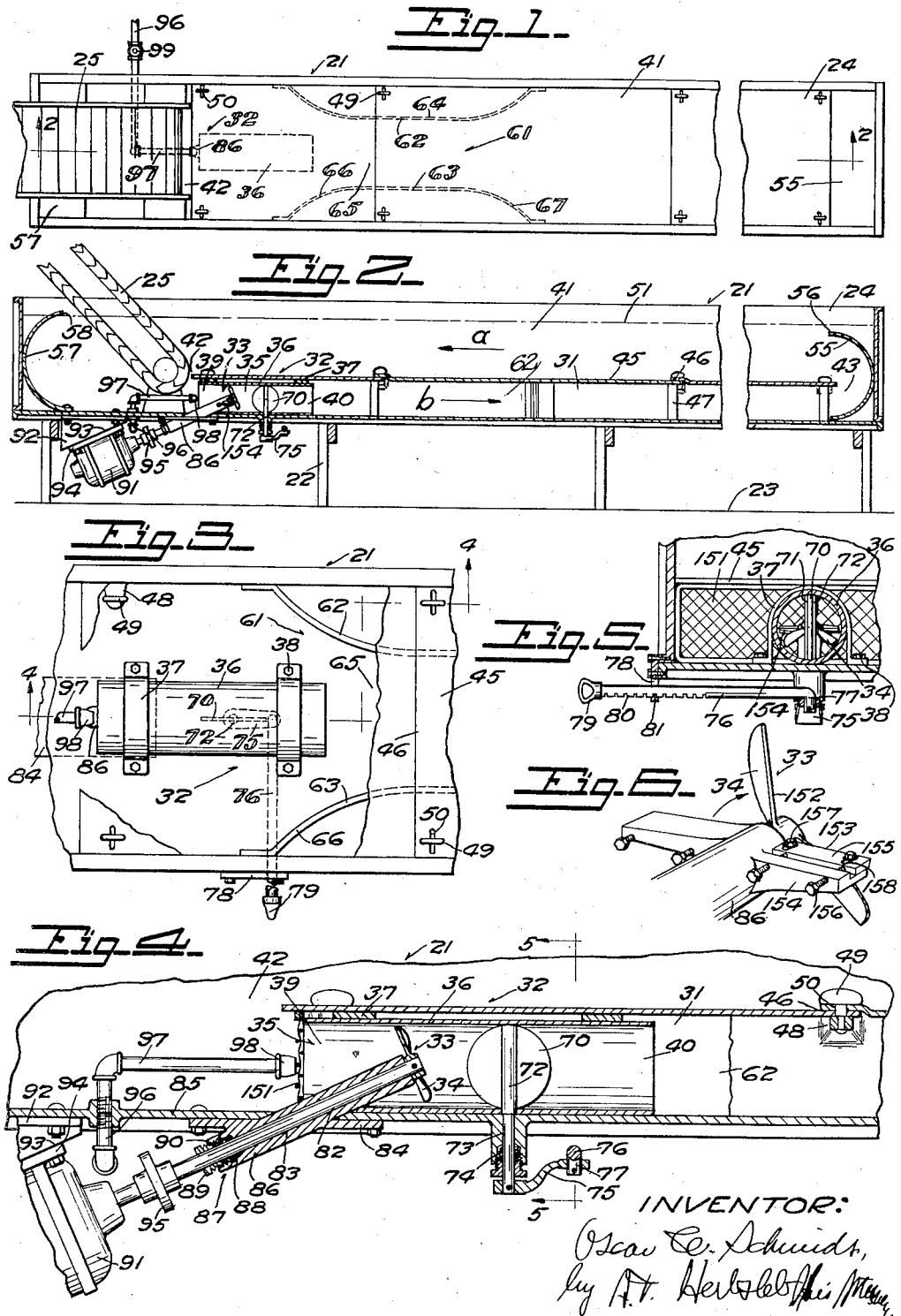
INVENTOR:
Oscar C. Schmidt, Feb. 26, 1935.  O. C. SCHMIDT  1,992,891
LIQUID CIRCULATING MEANS
Filed July 29, 1933  3 Sheets-Sheet 2
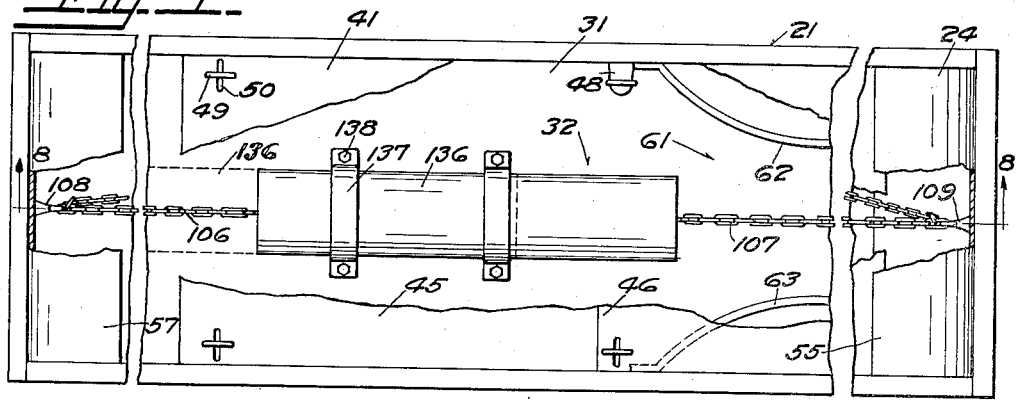
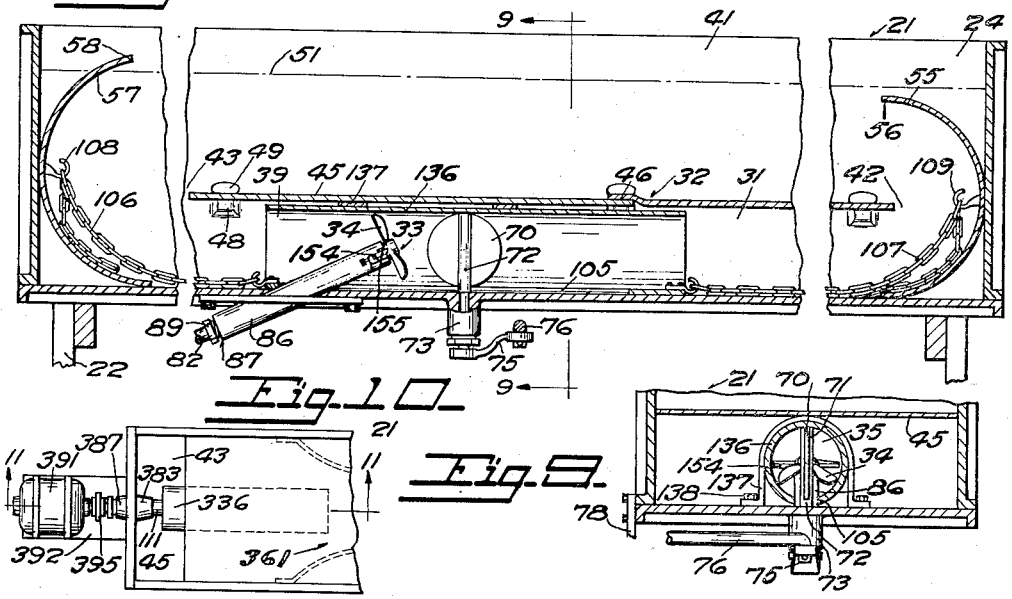
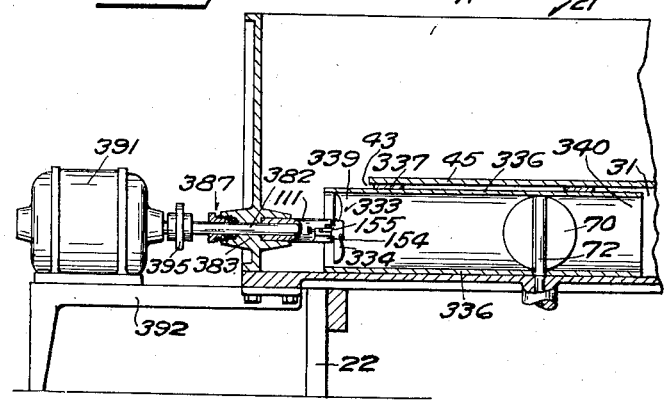
INVENTOR:
Oscar C. Schmidt,
by H. P. Herbold
His Attorney.

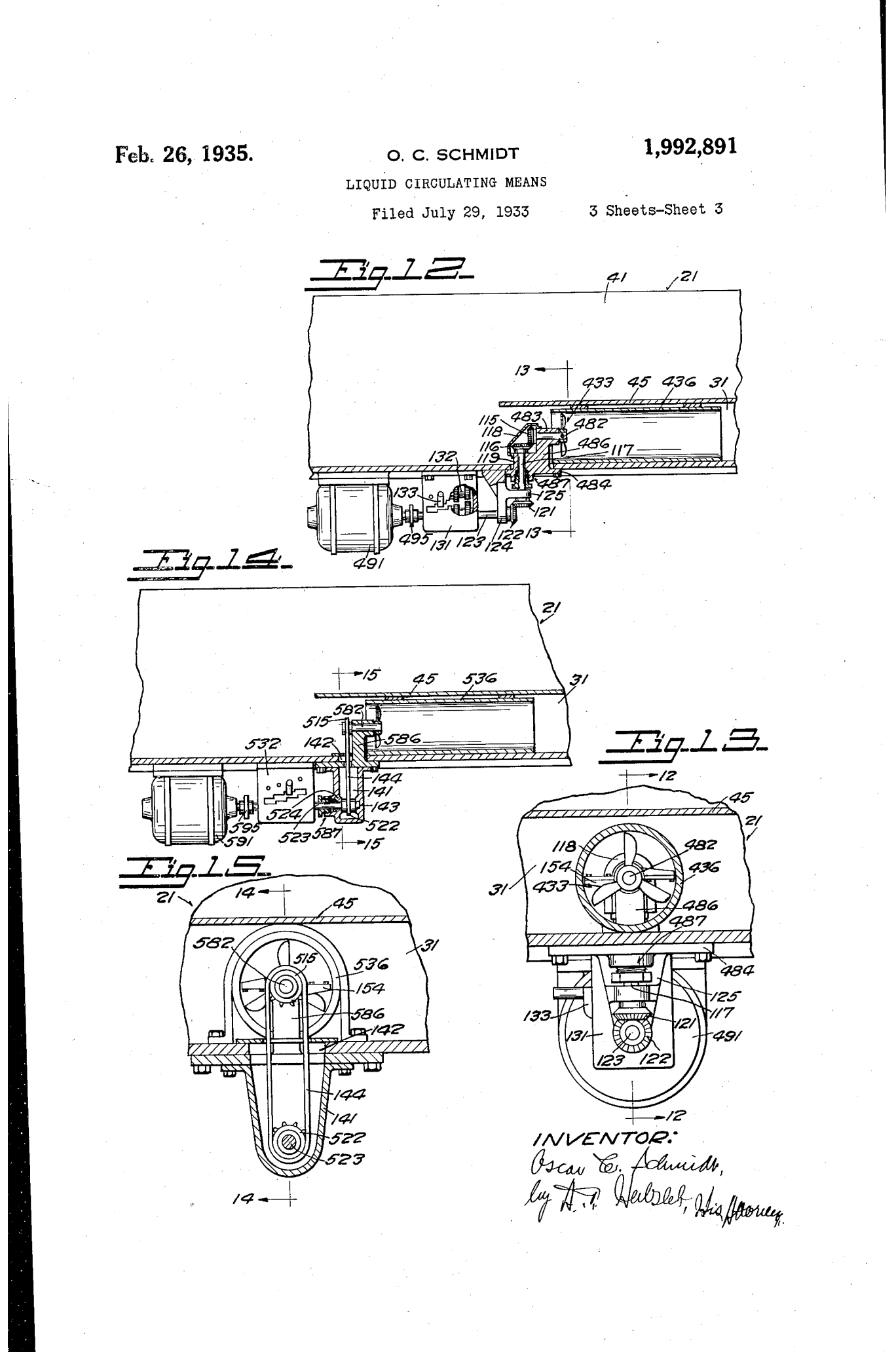

Feb. 26, 1935.　　　O. C. SCHMIDT　　　1,992,891
LIQUID CIRCULATING MEANS
Filed July 29, 1933　　　3 Sheets-Sheet 3

INVENTOR:
Oscar C. Schmidt,
by H. I. Herbert, his Attorney

Patented Feb. 26, 1935

1,992,891

UNITED STATES PATENT OFFICE 1,992,891

LIQUID-CIRCULATING MEANS

Oscar C. Schmidt, Cincinnati, Ohio, assignor to The Cincinnati Butchers' Supply Company, Cincinnati, Ohio, a corporation of Ohio Application July 29, 1933, Serial No. 682,879

8 Claims. (Cl. 17—15)

My invention relates to liquid circulating means, and is applicable in various relations, for instance, in swimming tanks, for creating a flow or current of water in which the swimmer swims; in testing tanks for testing the speed of boats, and in other relations.

My invention relates particularly, however, to so-called scalding tanks in the slaughtering industry, in which slaughtered animals are scalded for preparing the same for ready removal of their bristles and hair, and for cleaning the same.

My present invention is an adaptation of the invention shown, described and claimed in my copending application, Serial No. 668,026, filed April 26, 1933, for Liquid circulating means and method.

It is the object of my invention to provide novel means and relations of means for increased flow of the liquid; further, to provide a float passage or chamber in which the liquid is caused to move with sufficient speed to float the carcasses to the point of use, as to an elevating mechanism for moving the carcasses into a suitable dehairing machine, and whereby the pushing and the poling of the floating carcasses are largely avoided or dispensed with, and novel means for accelerating the flow of liquid in the float passage or chamber; and, further to provide novel means for heating the liquid in association with the flow of the same, and my invention consists in novel means for accomplishing these purposes.

The invention will be further readily understood from the following description and claims, and from the drawings, in which latter:

Fig. 1 is a plan view of an exemplifying device embodying my invention, and partly broken away.

Fig. 2 is a vertical axial section of the same, taken on the line 2—2 of Fig. 1, and partly broken away.

Fig. 3 is an enlarged plan view of the same, partly broken away.

Fig. 4 is an enlarged vertical longitudinal section of the same, taken on the irregular line 4—4 of Fig. 3, and partly broken away.

Fig. 5 is a cross-section of the same, taken in the plane of the line 5—5 of Fig. 4, and partly broken away.

Fig. 6 is a perspective view of the clearing means for the propeller.

Fig. 7 is a plan view of a modificaton of my improved device, partly broken away.

Fig. 8 is a vertical longitudinal section of the same, taken on the line 8—8 of Fig. 7, and partly broken away.

Fig. 9 is a cross-section of the same, taken in the plane of the line 9—9 of Fig. 8, and partly broken away.

Fig. 10 is a plan view, showing a further modification of my improved device, and partly broken away.

Fig. 11 is a vertical longitudinal section of the same, taken on the line 11—11 of Fig. 10, and partly broken away.

Fig. 12 is a vertical longitudinal section of an additional modification of my improved device, taken in the plane of the line 12—12 of Fig. 13, and partly broken away.

Fig. 13 is a vertical cross-section of the same, taken in the plane of the line 13—13 of Fig. 12.

Fig. 14 is a vertical longitudinal section of a still further modification of my improved device, taken in the plane of the line 14—14 of Fig. 15, partly broken away; and, Fig. 15 is a vertical cross-section of the same, taken in the plane of the line 15—15 of Fig. 14.

In the exemplifications of my invention shown in Figs. 1 to 6 inclusive of the drawings, there is a tank 21 in the form of a scalding tank, such as is used in the slaughtering industry. This tank may be of any desired form. It may be straight, or include sections at angles to each other to accommodate the space it is to occupy and the desired capacity. It is usually supported on posts 22 for raising the same off the floor 23.

The slaughtered animal, as a hog, is in practice dropped into one end of the tank, as at the end 24, off of a usual bleeding rail. The hog carcass is scalded in the tank to loosen the bristles and the hair and the dirt and scurf thereon, and is at the other end of the tank delivered to a suitable endless conveyor 25, which reaches into the tank for receiving the carcass and conveying the carcass to a usual dehairing machine.

In my improved device there is a passage 31 for the liquid. Accelerating means 32 are provided. They are exemplified in the passage 31. They are a modification of the accelerating means shown and described in my aforesaid copending application.

The accelerating means herein shown comprises a propeller 33, having propeller blades 34 so shaped that when the propeller is rotated it causes flow for moving the liquid. The propeller may be similar to a propelling screw such as used on motor boats. It has curved impact faces for advancing the liquid. The speed of movement of the liquid is governed by the pitch of the blades of the propeller, the speed of rotation of the same, the freedom with which the liquid moves, and the distance relation between the discharge of the pump and deflecting means associated therewith.

The propeller is preferably located in a passage 35, for instance, in a pipe 36. It thus constitutes a pump. The inside diameter of the pipe may be substantially equal in diameter to the path of the outer periphery of the propeller in the pipe. In the exemplification in Figs. 1 to 4 the pipe is fixed in place as by bands 37 about the pipe, the ends of the bands being bolted to the bottom of the tank by bolts 38.

When such pipe is used, the propeller causes flow of liquid through the pipe, causing suction upon the liquid at the entrance end 39 of the pipe, and causing ejection of the liquid at the exit end 40 of the pipe, the liquid being injected from the exit end of the pipe into the body of the liquid for causing flow in similar direction in the body adjacent to the pipe. The pipe extends parallel with the tank. The exit end of the pipe and the propeller are located in the liquid, being shown in the passage 31, which may be termed a feed passage.

A float passage or chamber 41 is provided in the tank. The accelerating means act on the liquid in this passage or chamber to cause flow of the liquid therein at desired speed. The communication between the float passage or chamber and the accelerating means is preferably through the feed pasage. The respective ends of the feed passage communicate, as through spaces 42, 43, with the float chamber. The flow of liquid in the respective passages 31, 41, is in reverse directions, as indicated by the arrows a and b.

A partition 45 is located between the feed passage and the float passage. It is preferably made sectional, with the sections having close joints 46 therebetween, the partition being movable for inspection and cleaning of the parts therebelow. The sections may rest on suitable supports 47, extending upwardly from the bottom of the tank, and on resting lugs 48 extending from the side walls of the tank.

These sections are preferably releasably secured in the tank, as by latches 49, pivoted to the lugs, and extending through slots 50 in the respective corners of the partitions, the latches being rotated on their pivots, after the placing of the partition sections, for extending over the side walls of the slots and holding the partition sections to the lugs. The supports 47 may be provided with similar latches.

The feed passage is preferably of substantially smaller cross-section than the cross-section of the liquid in the float chamber. The advisable level of the liquid is indicated by the dot and dash line 51. The liquid is usually water, or water with dissolving and cleansing ingredients.

A deflector 55 is located at the outflow end of the feed passage for deflecting the liquid coming from the feed passage so as to flow in reverse direction in the float chamber. This deflector is shown as a semi-cylindrical deflector, the upper end 56 of which is preferably below the level 51 of the liquid, so as to avoid ebullition and foaming of the liquid at the beginning of the float channel.

If desired, a deflector 57 may be located at the opposite end of the float channel for directing the liquid in reverse direction toward the feed passage. This deflector is also a semi-cylindrical deflector, the upper end 58 thereof, however, preferably extending above the level of the liquid in the float channel. This latter deflector is preferably under the elevator 25.

In order to increase the volume of flow action in the body of liquid and for directing such flow in the desired direction, deflecting means are provided for the liquid in adjacency to the propeller, or the exit mouth 40 of the pipe 36, such deflecting means being exemplified as a Venturi-like passage 61, in association with which the propeller or the pipe acts as an injector. The deflecting means contract the passage for the body of liquid, for bringing the same under more intimate influence of the liquid ejected or moved by the propeller or ejected from the passage 35.

The Venturi-like passage is shown as part of the feed passage, and as comprising deflectors 62, 63, shown as plates, whose respective ends are secured to the respective side walls of the passage 31, and which have an intermediate inwardly extending portion 64, forming a throat 65, rear slanting portions 66, slanting from the side walls of the tank toward the throat, and forward spreading portions 67, sloping from the throat toward said side walls, the side walls of the throat being formed by short flat portions of the plates. These plates extend through the height of the passage 31. These side walls form a flaring mouth or contracting portion of the feed passage.

Referring to Figs. 1 to 6 inclusive, the pipe 36 injects the accelerated liquid into the rear end of the Venturi-like passage, which causes accelerated flow in the liquid between said pipe and the contracting rear portion of the Venturi-like passage for accelerated flow of liquid through the Venturi-like passage, and accelerated flow through the balance of the feed passage 31, which accelerated flow is communicated to and causes acceleration of flow in the liquid in the float channel 41.

Means may be provided for adjusting the speed of flow of the liquid, which may be accomplished, for example, by adjusting the volume of liquid ejected from the pipe 36, as by a valve 70, shown in Figs. 1 to 4 inclusive; or by adjusting the relation of the injector pipe to the deflecting means, exemplified as the Venturi-like passage 61, exemplified in Figs. 7, 8 and 9, or by controlling the speed of rotation of the propeller or rotor of the pump, as by means of speed changing mechanism for the latter, exemplified in Figs. 12 to 14 inclusive.

Referring to the exemplification of Figs. 1 to 5 inclusive, a valve 70 is located in the pipe 36. This is shown as a flat or butterfly valve. It is secured in a slot 71 in a shaft 72, having a bearing 73 in the bottom of the tank, which bearing is provided with a suitable packing 74 for preventing leakage. The shaft extends through the bottom of the tank. The end of the shaft outside the tank has an arm 75 fixed thereto. The arm has a rod 76 jointed thereto at 77.

The rod is slidable in a bearing 78 suspended from the tank and has a handle 79 thereon by means of which the valve may be rocked for placing the same in suitable adjusted positions either lengthwise of the pipe 36, or at various suitable positions angularly with relation to the pipe, for obstructing the pipe to suitable extent, and thereby obstructing the passage of liquid therethrough. The valve is held in adjusted positions by providing the rod 76 with a rack 80, the teeth of which are arranged to engage a coacting tooth 81 at the bearing 78.

If passage of liquid through the pipe 36 is obstructed to greater or less extent, the propeller blades slip through the liquid, without causing the ejecting movement thereof which would take place if the pipe were not obstructed.

The pump or propeller may be rotated in suitable manner. It is shown fixed to the inner end of a shaft 82, which is journaled in a bearing 83 in a releasable section 84 of the bottom 85 of the tank. The bearing is preferably in a tube 86, against the inner end of which the hub of the propeller has end bearing.

There is preferably a stuffing box 87 for the shaft to prevent leakage from the tank. The packing of this stuffing box is shown in a recess 88 of the tube, a gland 89 having threaded connection 90 with the tube for suitably compressing the packing. The tube 86 may be part of the casting of the releasable section. The pipe 36 is provided with a hole through which the tube extends.

An electric motor 91 is suitably mounted on a hanger 92, suitably secured to the bottom of the tank, and having an inclined face 93, preferably parallel with the inclination of the shaft 82. The base 94 of the motor is adjustably secured to the inclined face in suitable manner. A suitable coupling 95 connects the rotor of the motor with the shaft 82.

The liquid may be suitably heated, and I prefer to heat the liquid in adjacency to the pump or propeller, so that the heat introduced is quickly diffused through a large portion of the liquid, for providing uniform heating of the liquid throughout the tank.

I have shown a steam pipe 96, which leads from a suitable source of supply, and has a branch 97 in the tank provided with a nozzle 98 in adjacency to the pump or propeller. The steam pipe is suitably connected with the wall of the tank so as to prevent leakage out of the tank. It is provided with a valve 99 to control the introduction of steam or heat into the tank.

Referring to Figs. 1 to 4 inclusive, the nozzle is arranged to inject steam toward the pump or propeller into the pipe 36, so that the steam is rapidly condensed and the heat therefrom rapidly absorbed by the accelerated stream of liquid adjacent to the propeller or pump, for heating this accelerated stream and charging the heated liquid into the adjacent liquid, which is accelerated by the accelerated flow of heated liquid injected thereinto by the pump or propeller for rapidly diffusing the heat throughout the body of the liquid.

Referring to Figs. 7, 8 and 9, I have shown the regulation of speed of flow of the liquid obtained by adjusting the injecting end of the pipe 136 relatively to the deflecting means or Venturi-like passage.

The pipe is exemplified as movable endwise with relation to the deflecting means for adjusting its mouth in distance relation to the deflecting means, so that there is greater or less space between the injecting end of the pipe and the deflecting portion of the deflecting means, as exemplified, for instance, in Figs. 7 and 8, by the full lines of the adjustable pipe, showing the pipe adjacent to the deflecting means, and the position of the pipe shown in dotted lines spaced from the deflecting means, the former resulting in a flow of greater volume of liquid through the Venturi-like passage, and the latter in a reduced speed of flow of less volume of liquid in said Venturi-like passage.

The pipe 136 is shown adjustable lengthwise by guidingly mounting the same in bands 137 extending upwardly from the bottom of the tank, the ends of the bands being shown bolted, as by bolts 138, to said bottom. The pipe 136 is provided with a slot 105, in which the tube 86 and the shaft 72 are located. Chains 106, 107 are fixed to the respective ends of the pipe 136 and extend to the respective ends of the feed passage 31, at which hooks 108, 109 are fixed.

The respective chains are pulled endwise in opposite directions for locating the pipe 136 in desired position endwise relatively to the Venturi-like passage, and selective links of the respective chains are passed about the respective hooks for positioning the pipe 136 in adjusted positions.

Referring to Figs. 10 and 11, the propeller is shown with its axis parallel with the length of the tank and the desired direction of flow of the liquid.

In this exemplification the propeller 333 is fixed to the end of a substantially horizontal shaft 382 journaled in a bearing 383 in the end wall of the tank, and having a tubular collar 111 fixed thereto, to take up end thrust due to rotation of the propeller. The bearing is provided with the usual stuffing box indicated at 387 to prevent leakage out of the tank. The motor 391 is fixed to a suitable bracket 392. A suitable coupling 395 is located between the rotor of the motor 391 and the shaft 382.

Referring to Figs. 12 and 13, the propeller may be so mounted as to have a horizontal axis of rotation, with driving mechanism provided therefor at the outside of the tank intermediate of the ends of the tank. One of the walls, for example, the bottom wall, has a stand 486 fixed thereto which may be on a removable section 484 of said wall.

The stand 486 is provided with a bearing 483 in which the propeller shaft 482 is journaled. The propeller shaft is provided with a bevel gear 115, with which a bevel gear 116 meshes. The latter bevel gear is fixed to a shaft 117, which extends outside the tank. A cover 118 on the stand 486 may be provided for the bevel gears. The shaft 117 is journaled in a bearing 119 in the removable section 484, which bearing is provided with a suitable stuffing box, as shown at 487, to prevent leakage from the tank.

The lower end of the shaft 117 has a bevel bear 121 thereon, which is meshed by a bevel gear 122 on a shaft 123 journaled in a bearing 124 on a hanger 125, secured to the removable section 484 of the wall of the tank.

An electric motor 491 is fixed to the wall of the tank. A speed changing gear box 131 is fixed to the bottom wall of the tank between the motor and the shaft 123. A suitable coupling 495 connects the driven shaft of the gear box with the shaft 123. The gear box has speed changing mechanism therein, indicated at 132, and is provided with a suitable adjusting arm 133, adjustment of which changes the speed ratio of the gears in the gear box delivered to the shaft 123. The speed changing mechanism may be of any suitable construction, or the motor may be a multi-speed motor, for imparting different speeds of rotation to the propeller 433. The pipe 436 may be made lengthwise adjustable as in Figs. 7 and 8, if desired.

In Figs. 14 and 15 I have exemplified driving means for the propeller, comprising a sprocket chain.

In this exemplification the propeller and its shaft may be mounted, as in the modification just previously described, a sprocket wheel 515 being secured to the propeller shaft 582. A well 141 extends from the removable section, the wall thereof being fixed to said removable section about the wall of a slot 142 therein.

A shaft 523 is journaled in a bearing 524 in one of the walls of the well, which is provided with a suitable stuffing box, as indicated at 587, to prevent leakage, and in a bearing 143 in the other wall of the well, which latter bearing has an outer closed end for preventing leakage. A sprocket wheel 522 is fixed to this shaft, and a sprocket chain 144 is looped about this sprocket wheel and the sprocket wheel 515 for rotating the propeller. A motor 591 and speed changing mechanism 532 may be provided for the shaft 523, as described with reference to the modification shown in Figs. 12 and 13.

Each of the modifications herein referred to may be provided with valve mechanism, or with the adjustable pipe, or with both said valve mechanism and said adjustable pipe, for controlling the flow of the accelerated liquid.

A screen 151 may be located at the entrance end of the passage 31, to prevent objects from floating into contact with the propeller. (Figs. 4 and 5).

Means are provided for clearing the propeller blades. Thus the blades 34 of the propeller 33 may have their advancing edges 152 formed as clearing edges, which coact with clearing edges 153 on brackets 154 extending from the tube 86. (Figs. 5 and 6). These clearing edges are preferably-cutting edges. The cutting edges 153 may be on cutter-blades 155 adjustable on the brackets 154 by bolts 156 and fixed in adjusted positions on said brackets by bolts 157 passing through slots 158 in the cutter-blade and threaded in the bracket 154. The brackets and blades are reversed at the respective sides of the tube.

The cutters cut hair and bristles and other objects which may pass through the screen 151 and may lodge on the propeller blades, in order to maintain said blades free of foreign substances.

It is obvious that changes may be made in the exemplifications of my invention herein shown and described without departing from the spirit of my invention, set forth in the accompanying claims.

My improved device provides simple and convenient means for accelerating the flow of the liquid in liquid circulating means, and provides novel and convenient means of simple construction for regulating the speed of flow in the float chamber, and provides novel means whereby the pump or propeller may be located in the liquid in the tank, and novel means whereby the pump or propeller may be operated by operating means located outside the tank.

I do not herein claim broadly means for accelerating the flow of liquid, nor broadly a liquid injector nor a deflector or Venturi-like passage in association therewith, for accelerating the liquid, nor means for heating accelerated liquid, nor the method of nor means for circulating liquid, such as herein shown and described, nor broadly liquid accelerating means located outside the tank for accelerating the liquid in the tank, having shown, described and claimed the same in my aforesaid copending application.

Having thus fully described my invention, what I claim as new and desire to secure by Letters Patent, is:

1. In liquid circulating means, the combination of a relatively larger horizontal passage, a relatively smaller horizontal passage whose respective ends communicate with said relatively larger passage, liquid deflecting means for said relatively smaller passage, an additional still smaller passage having a mouth directed toward said liquid deflecting means and spaced cross-sectionally from said liquid deflecting means, and a propeller in said additional still smaller passage acting on the liquid in said additional still smaller passage to cause accelerated flow in said additional still smaller passage and accelerated induced flow of additional liquid in said cross-sectional space between said mouth and said liquid deflecting means to cause accelerated flow of liquid through all said passages.

2. In liquid circulating means, the combination of a relatively larger horizontal passage for the main body of liquid, and means for accelerating the flow of liquid in said relatively larger passage comprising a relatively smaller horizontal passage having communication at its respective ends with said relatively larger passage and provided with a flaring portion, an additional passage of still smaller cross-section cross-sectionally spaced from said flaring portion, and a pump in the liquid in said additional passage injecting liquid at relatively high speed and small cross-section through said additional passage lengthwise into said relatively smaller passage at substantially said flaring portion but spaced cross-sectionally from the walls of said flaring portion for inducing flow and acceleration of additional liquid between said liquid accelerated through said additional passage and the walls of said flaring portion for accelerating the flow and increasing the volume of liquid passing through said flaring portion, whereby to accelerate the flow and increase the volume of liquid passing through said relatively smaller passage in advance of said flaring portion, which in turn accelerates the flow and increases the volume of liquid passing through said relatively larger passage, said pump having feeding connection with the liquid.

3. In combination, a series of horizontally extending channels for bodies of flowing liquid of respectively increasing cross-sectional dimensions communicating with one another to form a circulatory system, the largest of which is a float body, a reversing deflector between said channels for directing reverse flow of liquid in the respective channels, and a pump in the liquid for accelerating the flow of the liquid and discharging into a smaller passage having a mouth cross-sectionally spaced from the walls of a larger passage for induced flow of liquid through said space.

4. In liquid circulating means, the combination of a tank, a horizontally extending partition therein dividing the tank into a horizontal liquid passage and a horizontal liquid float chamber, the respective ends of said liquid passage having communication with said float chamber, said liquid passage including a Venturi-like passage, a smaller passage having a mouth cross-sectionally spaced from the walls of said Venturi-like passage, a propeller in said smaller passage in advance of said mouth for accelerated flow of liquid through said mouth into said Venturi-like passage and induced accelerated flow in a given direction through said cross-sectional space for cumulative large volume horizontal flow in said liquid passage, and deflecting means between said liquid passage and said float chamber facilitating reverse horizontal flow of liquid in said float chamber.

5. In a scalding tank, the combination of a horizontal float chamber, a horizontal liquid passage therefor including a horizontal Venturi-like passage, the respective ends of said liquid passage communicating with said float chamber, a rotary liquid propeller in said tank for the liquid, and a passage for the liquid accelerated by said propeller extending from said propeller and having a mouth cross-sectionally spaced from said Venturi-like passage and inducing accelerated flow of liquid through said cross-sectional space and distributing the acceleration caused by said liquid propeller throughout the cross-section of said liquid passage and causing evenly distributed acceleration of the liquid in said float chamber.

6. A scalding tank comprising a horizontally extending partition in its lower part dividing the tank into an upper horizontal float chamber and a lower horizontal liquid passage, said horizontal liquid passage including deflecting means to form a horizontal Venturi passage, a tube in said liquid passage having a mouth cross-sectionally spaced from the walls of said Venturi passage, liquid impelling means in said tube, a drive shaft therefor extending through a wall of said tank into said tube, said tube having a lengthwise slot at said last-named wall through which said shaft extends, the walls of said slot being proximate to said wall of said tank for substantially closing said slot, and means for adjustably positioning said tube in axial direction for locating its mouth in adjustable positions for adjusting the cross-sectional space between said mouth and the walls of said Venturi passage for accelerating flow of liquid through said tube and adjustable induced accelerated flow of liquid through said cross-sectional space.

7. A scalding tank comprising a horizontally extending partition in its lower part dividing the tank into an upper horizontal float chamber and a lower horizontal liquid passage, said horizontal liquid passage including deflecting means to form a horizontal Venturi passage, a tube in said liquid passage having a mouth cross-sectionally spaced from the walls of said Venturi passage, liquid impelling means in said tube, a drive shaft therefor extending through a wall of said tank into said tube, a valve in said tube, an operating shaft therefor, said tube having a lengthwise slot at said last-named wall through which said shafts extend, the walls of said slot proximate to said wall of said tank for substantially closing said slot, and means for adjustably positioning said tube in axial direction for locating its mouth in adjustable positions for adjusting the cross-sectional space between said mouth and the walls of said Venturi passage for accelerating flow of liquid through said tube and adjustable induced accelerated flow of liquid through said cross-sectional space.

8. In combination, a scalding tank comprising a horizontally extending partition in its lower part dividing the tank into an upper horizontal float chamber and a lower horizontal liquid passage, said horizontal liquid passage including deflecting means forming a Venturi passage, oppositely presented arcuate deflectors at the respective ends of said passage for reversals of flow of liquid at the respective sides of said partition, an axially movable tube in said passage having a mouth movably cross-sectionally spaced from the walls of said Venturi passage, liquid impelling means impelling liquid through said tube, flexible connections extending from the respective ends of said tube, and holding means in said arcuate deflectors adjustably holding said flexible connections for axial adjustments of said tube.

OSCAR C. SCHMIDT.